United States Patent [19]

Kalstroem et al.

[11] Patent Number: 4,944,593
[45] Date of Patent: Jul. 31, 1990

[54] VOLUME-MEASURING METHOD FOR SURFACE DEPRESSIONS

[75] Inventors: Reiner Kalstroem, Kiel; Erich Schulz-DuBois, Preetz, both of Fed. Rep. of Germany

[73] Assignee: Dr. Ing. Rudolf Hell GmbH, Fed. Rep. of Germany

[21] Appl. No.: 153,840

[22] PCT Filed: May 26, 1987

[86] PCT No.: PCT/DE87/00239
§ 371 Date: Dec. 30, 1987
§ 102(e) Date: Dec. 30, 1987

[87] PCT Pub. No.: WO87/07369
PCT Pub. Date: Dec. 3, 1987

[30] Foreign Application Priority Data
May 27, 1986 [DE] Fed. Rep. of Germany ....... 3617714

[51] Int. Cl.$^5$ ............................................. G01B 11/06
[52] U.S. Cl. ................................ 356/379; 250/458.1
[58] Field of Search .............. 356/379, 378, 372, 237; 250/302, 458.1, 459.1, 461.1

[56] References Cited

U.S. PATENT DOCUMENTS

| | | |
|---|---|---|
| 2,359,114 | 9/1944 | Jebens et al. . |
| 2,774,886 | 12/1956 | Forest et al. . |
| 2,920,203 | 1/1960 | Switzer et al. ...................... 250/302 |
| 3,185,022 | 5/1965 | Holeman . |
| 3,341,705 | 9/1967 | Alburger ............................. 250/302 |
| 3,956,630 | 5/1976 | Mellows . |
| 4,460,274 | 7/1984 | Schumann et al. . |
| 4,664,514 | 5/1987 | Corby, Jr. ........................... 356/237 |

FOREIGN PATENT DOCUMENTS

| | | |
|---|---|---|
| 904353 | 12/1953 | Fed. Rep. of Germany . |
| 2907620 | 8/1980 | Fed. Rep. of Germany . |
| 3134264 | 3/1983 | Fed. Rep. of Germany . |
| 763885 | 12/1956 | United Kingdom . |

OTHER PUBLICATIONS

Patent Abstracts of Japan vol. 9, No. 113 of May 17, 1985, 60-1502.
Pp. 70 and 73 of Industrie, No. 24/25, vol. 25, 1986.

Primary Examiner—F. L. Evans
Attorney, Agent, or Firm—Hill, Van Santen, Steadman & Simpson

[57] ABSTRACT

A method for measuring volume of surface depressions wherein the depression to be measured is or filled with a material which emits wavelength-shifted scatter light under irradiation. The material is illuminated with a light source whose wavelength lies in the absorption region of the material and the wavelength-shifted intensity of the scatter light of the material excited by the light source is measured with a photodetector, whereby the measured intensity is a measure of the volume of the surface depression.

12 Claims, 5 Drawing Sheets

VOLUME-MEASURING METHOD FOR SURFACE DEPRESSIONS

BACKGROUND OF THE INVENTION

The present invention is directed to a volume-measuring method for surface depressions.

DESCRIPTION OF THE PRIOR ART

In measurements at surfaces or, respectively, surface depressions, a distinction must be made between roughness (order of magnitude: $<=5$ $\mu$m), ripple (10-100 $\mu$m) and shape ($<=10$ $\mu$m). The dissertation by G. Thurn, "Automated Surface Testing by Computer-Assisted Measurement of the Scattered Light Distribution", Technical University of Berlin, 1984, provides an overview of the standard mechanical and optical methods for the identification thereof.

Mechanical sensing with a diamond sensor covers roughness, ripple and shape in accord with the filter characteristics of the measuring arrangement employed but is relatively slow (sensing rate = $<0.5$ mm per second) and leaves traces behind on the surface.

The optical methods which are disclosed, for example, by Brodmann, "Surface Roughness Measurement of Turned and Ground Surfaces with a Light Scattering Instruement", third International Conference on Metrology and Properties of Engineering Surfaces, Middlesborough, Apr. 10 through 12, 1985; or Baker, L.R., "Comparator Technique to Measure Micro Height Variations", third Conference on Metrology and Properties of Engineering Surfaces, Middlesborough, Apr. 10 through 12, 1985; or Vorburger, T.V., "Optical Measurement of Surface Roughness", third Conference on Metrology and Properties of Engineering Surfaces, Middlesborough, Apr. 10 through 12, 1985, have the advantages of a non-contacting and fast sensing but, due to the short light wavelength employed, are only suitable for roughness measurements. A height profile or, respectively, statistical parameters such as height distributions or, respectively, surface angle distributions are obtained, Thomas, T.R., "Characteristic of Surface Roughness, Precision Engineering", pages 97ff, IPC Business Press 1981, being referenced in this respect.

A case of volume measurement of surface depressions which often occurs in practice arises in the manufacture of printing forms for rotogravure printing. The surface of this printing form, usually an engraved or etched impression cylinder, comprises a plurality of small cups (depressions) distributed in accord with the later printing raster which are separated from one another by webs. The rotogravure process with this printing form is executed such that the small cups are filled with ink, the excess ink is removed with a ductor that is carried by the webs, and the printing material is brought into contact with the surface of the impression cylinder, whereby the printing ink is transferred from the small cups onto the printing material.

The transferred ink volume determines the tint value of the respectively printed point, for which reason the volumes of the individual cups are a matter of concern in the manufacture of the printing form. When engraving these cups with a diamond stylus, the cup volume was previously to identified by measuring the cup diagonals on the copper surface, whereby the volume was identified with approximation formulas from the shape of the diamond stylus and the geometry of the printing raster. In accord with a known measuring procedure, a microscope is employed for this purpose, this microscope being placed on the surface of the printing form. This measurement, wherein a respective plurality of cups are measured for a plurality of different gray tints wastes valuable time, for example on the order of half an hour. The production outage connected with this time outlay makes it obvious that a measuring principle be sought which makes dynamic measurements possible. This demand is further intensified in that the shape of the engraved cups is not established by the geometry of a stylus given a more recent electron beam engraving method as was the case, for example, when engraving the cups with the diamond stylus. A direct measurement is therefore desirable for identifying the engraved volume.

SUMMARY OF THE INVENTION

It is therefore an object of the present invention to specify a volume-measuring method for surface depressions which enables a direct volume measurement. In particular, it should become possible in a simple way to also acquire the volume of the ink-transferring cups of rotogravure forms.

The invention achieves this by the features recited in the characterizing part of claim 1. Advantageous developments of the invention are recited in subclaims 2 through 12.

BRIEF DESCRIPTION OF THE DRAWINGS

The invention shall be set forth in greater detail below with reference to FIGS. 1 through 6. Shown therein are:

FIG. 6a is an illustration of the measured fluorescence values at the surface depressions of FIG. 5a.

DESCRIPTION OF THE PREFERRED EMBODIMENTS

Figure 1:
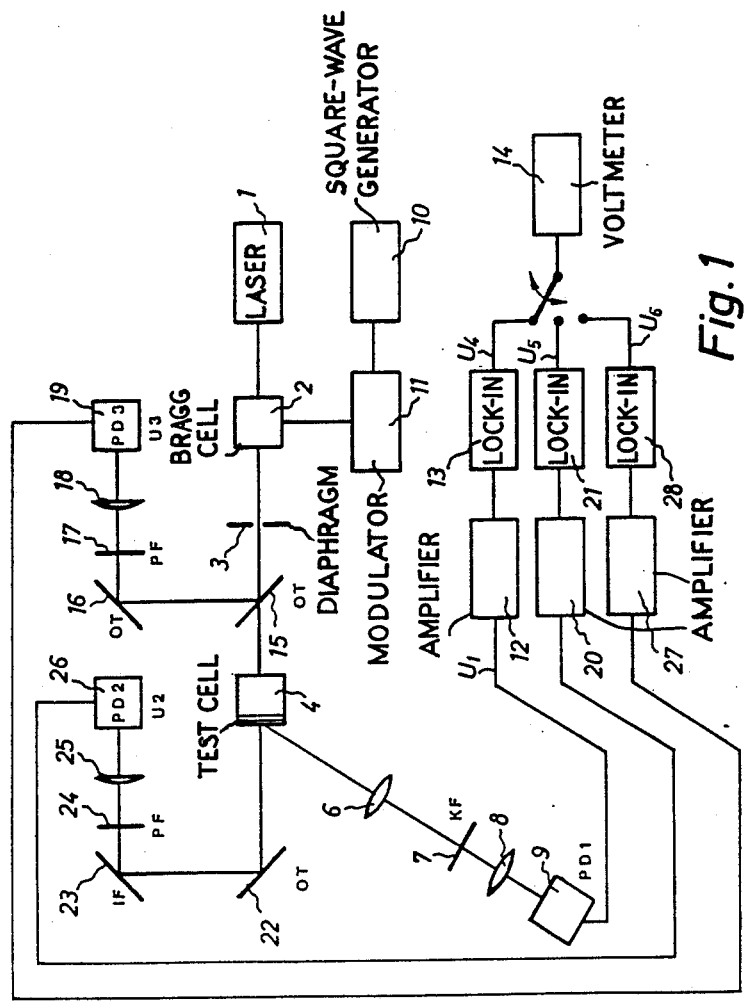
FIG. 1 shows a measuring installation for practising the measuring method.

FIG. 1 shows a measuring arrangment with which the layer thickness of a fluorescent color can be fundamentally identified, whereby the volume of the transirradiated material results given knowledge of the beam diameter.

A laser 1 is provided in FIG. 1, which emits light onto a test cell 4 which is filled with a fluorescent color example via a Bragg cell and a diaphragm 3. An air-cooled 20 mW argon ion laser (488 nm) whose beam is modulated by the Bragg cell 3 can preferably be used as the laser. The diaphram 3 is provided so that the first diffraction order is blanked out. The test cell 4 is wedge-shaped and contains the color sample. The modulated laser beam impinges upon the test cell and has a diameter of about D=2 mm at the location of the sample. The fluorescent light that is emitted by the color sample is imaged onto a phototransducer 9 at an angle which in the opposite direction to the incident beam, and imaged thereon via a lens 6, a cut-off filter 7 and a further lens 8. The laser is modulated with the Bragg cell 2, so that an ac signal is generated in the phototransducer which is a photodiode in the present case, and, thus, steady radiation components that should not be measured are suppressed in this manner. The Bragg cell operates at 70 MHz and is in turn modulated by a square-wave generator 10 which is followed by modulator 11.

The signal of the photo cell 9 is supplied an amplifier 12, then to a lock-in stage 13 (for example an integrated circuit of the type AD630 from Analog Devices) and to a voltmeter 14 which indicates the measured results. The fluorescent light is imaged onto the photodiode 9 in forward direction which is opposite to the incident beam. A cut-off filter is mounted in the beam path in order to filter out laser light components which may be potentially present.

For monitoring the laser power during the measurement, a partial beam is gated out following the diaphragm 3 with a beam splitter 15, this partial beam being forwarded via a deflecting mirror 16, via a pole filter 17 and via a lens 18 onto a further phototransducer 19. The signal of the phototransducer 19, just like the signal of the phototransducer 9, is forwarded to the voltmeter 14 via an amplifier 20 and via a lock-in stage 21. For measuring the transmission through the test cell 4, the beam passing through it is forwarded via a deflecting mirror 22 onto an interference filter 23 which is followed by a pole filter 24 and by a lens 25, whereby the light which has passed through the pole filter and lens proceeds onto a further phototransducer 26. The output signal of the phototransducer 26 is likewise forwarded to the voltmeter 14 via an amplifier 27 and via a further lock-in circuit 28.

Instead of the pole filters which are merely used for attenuating the beam, optical wedges or neutral glass filters can also be utilized.

A calibration of the measuring system is needed in order to be able to allocate the measured voltages to the corresponding, absolute intensities of the beams. A power meter is also used for that purpose, this being used to measure the direct laser output power, the power after the Bragg cell, the power after the diaphragm, the power before the sample specimen and the power after the photodiode 9. The calibration of the photodiode 9 occurs in two steps. Measurement is thereby carried out with a flourescent specimen in the test cell 4 whose stability is known. First, the flourescence is measured with the photodiode 9 depending on the incident laser light power. The photodiode 9 is then replaced by the power meter. An allocation of the flourescence intensity to the photodiode voltage is thus obtained. The remaining photodiodes 19 and 26 can be calibrated in the same fashion.

Figure 2:
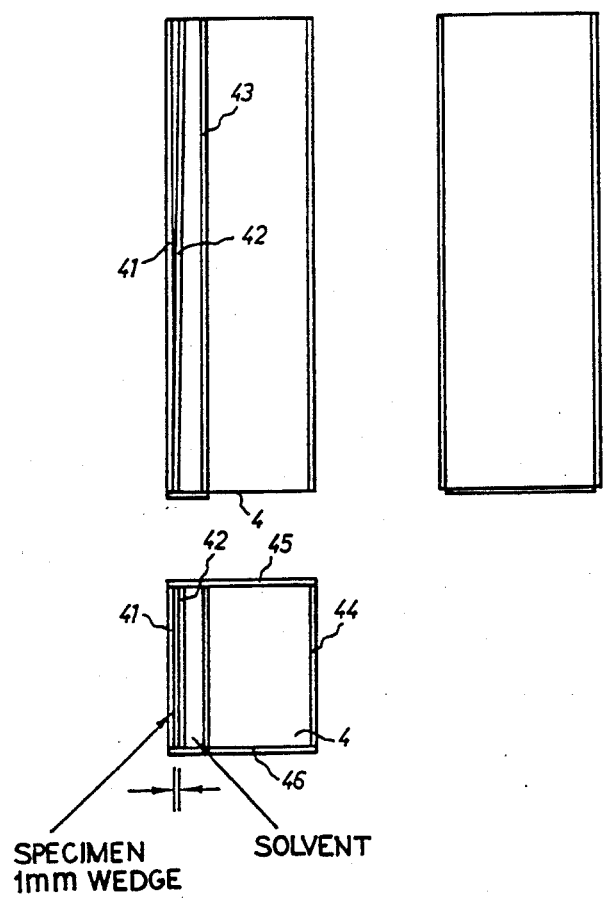
FIG. 2 illustrates a test cell for the measurement of FIG. 1.

FIG. 2 shows the test cell 4 in a side view and in a plan view. It is composed of a plurality of glass plates, whereby the wedge-shaped part is formed of the plates 41 and 42 and a further plate 44 for increasing the stability is provided. These plates are held together by side plates 45 and 46. The specimen is situated in the space between the plates 41 and 42 and the solvent is situated in the space between the plates 42 and 43. As already mentioned, the test cell can be shifted perpendicular to the laser beam with a micrometer (not shown) in order to be able to measure different volumes or, respectively, layer thicknesses. The layer thickness d is determined by introducing a copper piece having a known thickness into the wedge-shaped layer and by adjustment in the laser beam, being further determined by the geometry of the test cell and by the relative height of the test cell within the measuring arrangement which is set with the micrometer screw.

The solvent is provided so that identical indices of refraction are present at the boundary surfaces and a straight beam course in the wedge-shaped layer and after departing the test cell as well is guaranteed. The illuminated volume V can be determined from the beam diameter D in the specimen and from the layer thickness d which derives from the measured flourescence intensity.

Figure 3A:
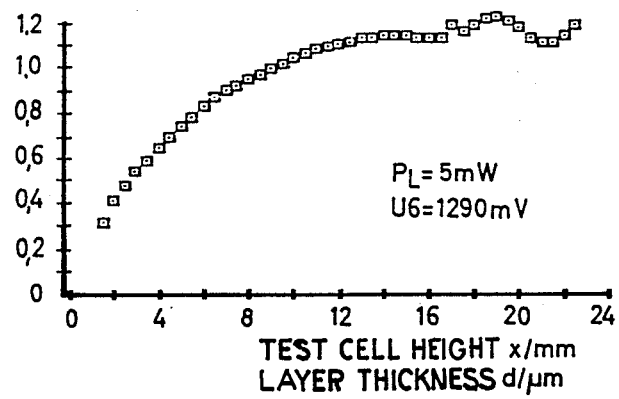
FIG. 3a is a diagram showing the fluorescence dependent on the layer thickness.

FIG. 3a shows a diagram wherein the flourescence $U_4/U_6$ was recorded dependent on the layer thickness of the color. To this end, the wedge-shaped test cell was shifted in height relative to the measuring beam. The laser power amounted to 5 mW this corresponding to a voltage of 1290 mW at the reference diode 19 (PD3). Since a wedge-shaped test cell is involved, the layer thickness is known from the relative height of the test cell, so that the allocation of flourescence intensity and layer thickness is unambiguously defined by this measurement.

The dependency of the flourescence intensity on layer thickness, concentration and incident intensity of laser light derives from the following equation:

$$I_f(d, c, I_L) = k \times I_L \times (1 - exp(-0.01 \times c \times d))$$

wherein k = constant corresponding to the calibration of $U_4$,
$I_L$ = laser intensity incident onto the specimen,
c = concentration in g/liters, and
d = layer thickness in m, whereby the value 0.01 can differ dependent on the measuring installation.

As may be seen herefrom, the measured curve corresponds to the course of the equation, and it may be seen that the flourescence intensity is dependent on the number of color molecules available for flourescence, whereby this relationship between flourescence intensity and layer thickness can be utilized for thickness measurement and, thus, for volume measurement of the invention as well.

Figure 3B:
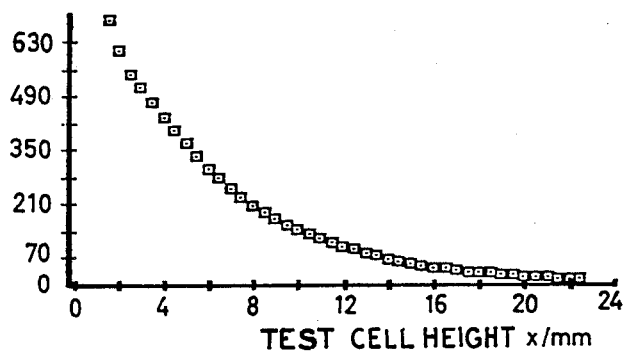
FIG. 3b is a diagram showing the transmission dependent on the layer thickness.

In comparison to FIG. 3a, FIG. 3b shows the transmission of the laser light allowed to pass through the specimen, i.e. the voltage $U_5/U_6$, whereby it may be seen that the transmission decreases with increasing flourescence. In order to obtain usable measured values, the following properties of the color employed or, respectively, of the solvent wherein the color is dissolved during the measurement are required.

The color should have a solubility in a transparent solvent which wets the surface to be measured well.

A high quantum yield of the flourescence of the color which produces a high signal strength and, thus, reduced errors due to noise is likewise desirable.

Further, the stability of the color in the face of illumination and solvent should be established given the highest possible concentration (photo-chemical and chemical stability). Further, the solvent should be uniform (no emulsion/suspension) and should exhibit low volatility at room temperature so that the concentration is maintained during the measurement.

For example, these demands are met by the following substances:

EXAMPLE 1 pyridin 1 in ethyleneglycol, c=1.75 g/liter or
pyridin 1 in propylenecarbonate, c=0.5 g/liter

EXAMPLE 2 rhodamine 6 G in methanol or propylenecarbonate, c=0.6 g/liter or rhodamine 6 G in ethyleneglycol or propylenecarbonate, c=0.5 g/liter.

EXAMPLE 3 rhodamine/6 G in ethanol/athyleneglycol mixture (1:10–20), c=0.5 g/liter.

Figure 4:
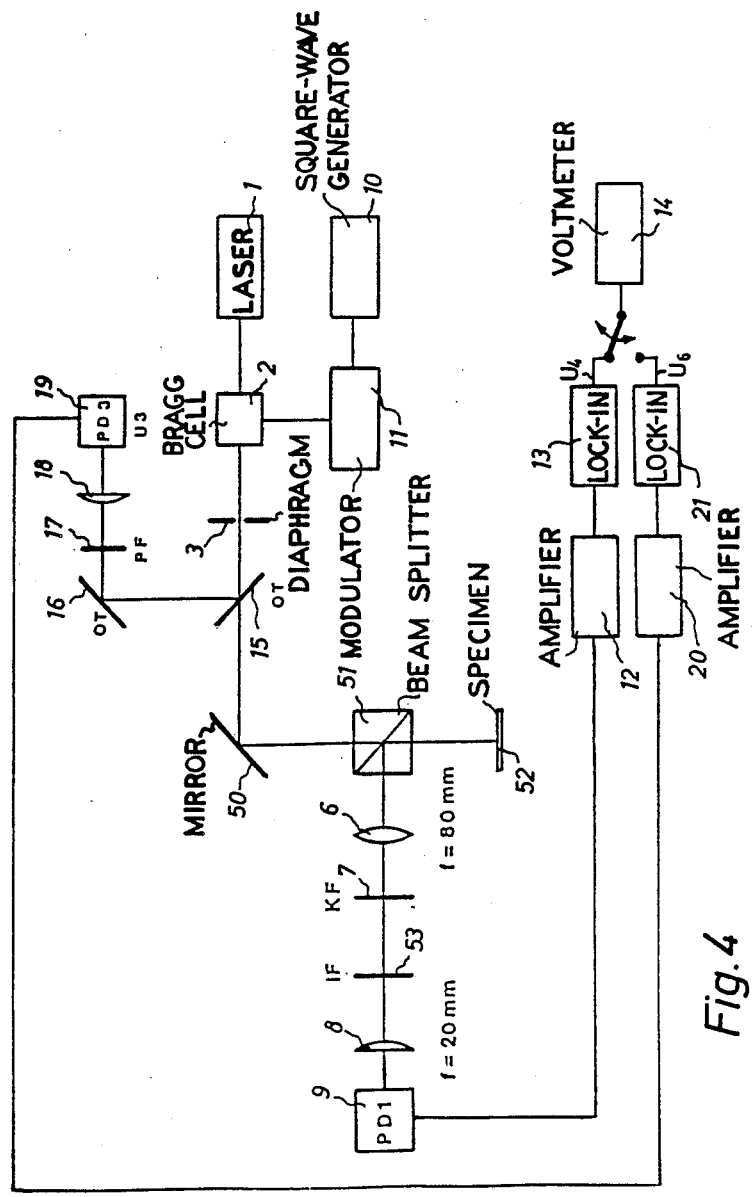
FIG. 4 illustrates a measuring arrangement for the direct measurement of surface depressions.
Figure 5A:
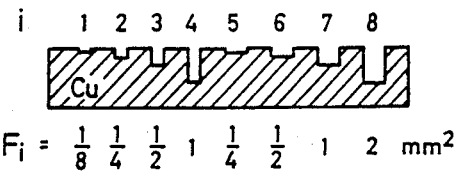
FIG. 5a is an example of a surface to be measured comprising U-shaped grooves.
Figure 5B:
FIG. 5b is an example of a surface having V-shaped grooves.

The invention is not limited to the concentrations and mixing ratios recited above; rather, the measurement is also possible with other concentrations and other colors or, respectively, solvents which exhibit the aforementioned properties. Conditioned by the respective color, the measurement is also possible in other wavelength ranges FIG. 4 shows a practical measuring installation for the direct measurement of surface depressions U-shaped or, respectively, V-shaped grooves which were engraved into a copper surface where measured, as shown in FIGS. 5a and 5b. The measuring format fundamentally corresponds to the measuring format of FIG. 1, without transmission channel. The assemblies of FIG. 4 which coincide with the assemblies in FIG. 1 have been described with the same reference numerals.

After it has departed the beam splitter 15 which can be a specimen slide glass, the laser beam is directed onto the specimen 52 via a mirror 50 and a beam splitter 51. For example, the specimen may be a surface with corresponding depressions illustrated, in FIGS. 5a or 5b. A part of the flourescent light is separated out via the beam splitter 51 and, as in FIG. 1, proceeds onto the photodiode 9. A cut-off filter 7 and an interference filter 53 are provided in the beam path between the beam splitter 51 and the photo diode 9 ($\lambda$=488 nm) for filtering the remaining laser light out.

Figure 6A:
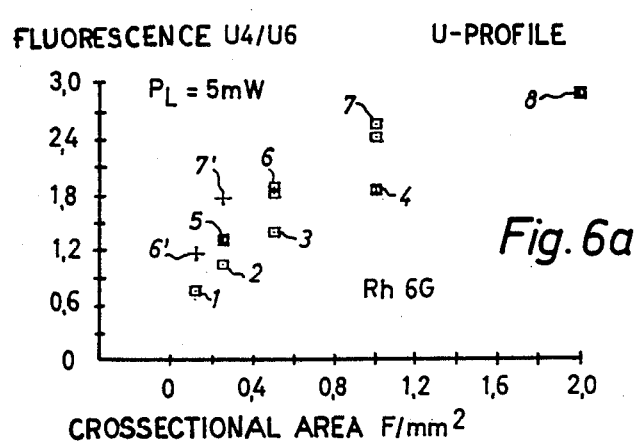
Figure 6B:
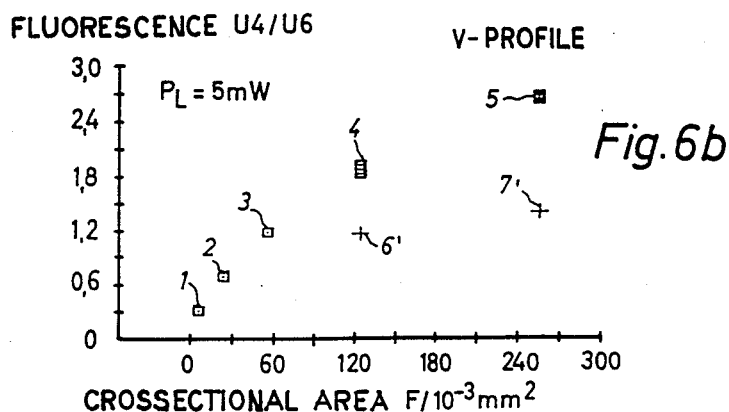
FIG. 6b is an illustration of the measured fluorescence values at the example of FIG. 5b.

The measured values for the flourescence $U_4/U_6$ shown in FIG. 6a for the U-shaped profile and in FIG. 6b for the V-shaped profile result. Measurement was carried out with rhodamine/6 G since this color is especially flourescence-effective and stable. The numbers $i=1-8$ of FIG. 5a are allocated to the corresponding depths $F_i$ of FIG. 5a. Measurement was carried out with a laser power of 5 mW, but the measurement is likewise possible given correspondingly different laser powers.

Measurement was repeatedly carried out to obtain the measured values of FIGS. 6a and 6b and one can see that the same measured value was recorded again given the measured values 1 through 5 in FIG. 6a. Slight deviations were recorded only given the measured values 6 and 7. The same is true in FIG. 6b for the measured values 1 through 3 or, respectively, 4 and 5. The measured values of FIG. 6b refer to five V-shaped depressions of which only two, however, have been shown in FIG. 5b.

The invention has been set forth above with reference to the flourescence effect as an example for the utilization of the wavelength-shifted scattered light of specific substances relative to the volume measurement or, respectively, layer thickness measurement. What is referred to as the "Raman effect", however, can likewise be utilized for the volume measurement instead of the flourescence effect, in that the volume to be measured is filled with a material at which this Raman effect occurs. When, for example, benzene is irradiated with mecury arc light, then, in addition to the spectra line of the ultraviolet light beamed in, one or more further spectra lines shifted in wavelength appear whose intensities are likewise dependent on the layer thickness of the material. The Raman effect is described, for example, in the dtv Lexikon er Physik Volume 7, P-RE Deutscher Taschenbuchverlag, Munich, February 1971, ISBN 3-423-03047-X, pages 227 through 229.

Although the invention has been described with respect to preferred embodiments, it is not to be so limited as changes and modifications can be made which are within the full intended scope of the invention as defined by the appended claims.

We claim:

1. A method of measuring the volume of surface depressions, comprising the steps of filling the depression to be measured with a material which emits wavelength-shifted scattered light under irradiation; and illuminating said material with a light source which has a wavelength that lies in the region of the absorption spectrum of said material; and measuring the intensity of the wavelength-shifted scattered light which is emitted by the material with a photo-detector, and wherein the measured intensity indicates the volume of the surface depression.

2. A method of measuring volume according to claim 1, wherein said material produces colors whose frequency-shifted scattered light occurs due to fluorescence.

3. A method of measuring volume according to claim 1, wherein said material produces frequency-shifted scattered light which occurs due to the Raman effect.

4. A method according to claim 2, wherein pyridin is the material which is used and has a color, and said pyridin is dissolved in ethyleneglycol with a concentration of c<0.75 g/liter.

5. A method according to claim 2, wherein pyridin is the material used and has a color, and said pyridin is dissolved in propylenecarbonate with a concentration of c≦0.5 g/liter.

6. A method according to claim 2, wherein rhodamine 6 G is the material used and has a color, and said rhodamine/6 G is dissolved in propylenecarbonate with a concentration of c≦0.6 g/liter.

7. A method according to claim 2, wherein rhodamine 6 G is the material used and has a color, and said rhodamine/6 G is dissolved in ethyleneglycol or in propylenecarbonate having a concentration of c≦0.5 g/liter.

8. A method according to claim 2, wherein rhodamine 6 G is the material used and has a color, and said rhodamine/6 G is dissolved in methanol-ethyleneglycol mixture (1:10–20) with a concentration of c≦0.5 g/liter.

9. A method according to claim 3, wherein benzene is the material used as the filler for the depressions.

10. A method according to claim 1 or 2 or 3 or 4 or 5 or 6 or 7 or 8 wherein said illumination of the depression with the light source extends over the entire depression.

11. A method according to claim 2 or 4 or 5 or 6 or 7 or 8 wherein said illumination of the depression is done with a relative scan movement of a light beam which has a diameter which is smaller than the diameter of the depression, and the color is scanned when scanning the depression of the surface and measuring the intensities of said frequency-shifted scattered light to obtain the volume of the depression.

12. Apparatus for measuring the volume of a surface depression comprising, a light source which is directed into said surface depression, said depression filled with material which emits light having a wavelength which lies in the absorption spectrum of said material, a first detector means mounted to receive and measure the intensity of the light emitted from said material when it is excited by the light source; a second detector means mounted to receive a part of the light from the light source, a first beam splitter which is mounted between said light source and said material for receiving and separating said part of said light, a second beam splitter for reflecting the light emitted by said irradiated material, said second beam splitter mounted in the light beam path between said first beam splitter and said material; a filter for filtering out light from the light source, said filter mounted between said second detector and said second beam splitter; and an amplifier and measuring means which are connect to said first and second detector means so as to measure the intensities of the light received by said first and second detector means.

* * * * *